United States Patent [19]

Brantley et al.

[11] 4,432,232

[45] Feb. 21, 1984

[54] DEVICE AND METHOD FOR MEASURING THE COEFFICIENT OF PERFORMANCE OF A HEAT PUMP

[75] Inventors: Vanston R. Brantley, Knoxville; Donald R. Miller, Kingston, both of Tenn.

[73] Assignee: The United States of America as represented by the United States Department of Energy, Washington, D.C.

[21] Appl. No.: 379,418

[22] Filed: May 18, 1982

[51] Int. Cl.$^3$ .......................................... G01M 19/02
[52] U.S. Cl. .................................. 73/432 R; 62/127; 62/129; 374/1; 374/39
[58] Field of Search ................ 73/168, 432 R, 432 V; 374/1, 31, 39, 45; 62/125, 127, 129

[56] References Cited

U.S. PATENT DOCUMENTS

| | | | |
|---|---|---|---|
| 2,733,600 | 2/1956 | Sahs et al. | 73/168 |
| 2,764,021 | 9/1956 | Sims et al. | 374/31 |
| 4,186,563 | 2/1980 | Schulze | 374/39 |
| 4,196,628 | 4/1980 | Schulze et al. | 73/432 V |

Primary Examiner—S. Clement Swisher
Attorney, Agent, or Firm—David E. Breeden; Stephen D. Hamel

[57] ABSTRACT

A method and instrument is provided which allows quick and accurate measurement of the coefficient of performance of an installed electrically powered heat pump including auxiliary resistance heaters. Temperature sensitive resistors are placed in the return and supply air ducts to measure the temperature increase of the air across the refrigerant and resistive heating elements of the system. The voltages across the resistors which are directly proportional to the respective duct temperatures are applied to the inputs of a differential amplifier so that its output voltage is proportional to the temperature difference across the unit. A voltage-to-frequency converter connected to the output of the differential amplifier converts the voltage signal to a proportional frequency signal. A digital watt meter is used to measure the power to the unit and produces a signal having a frequency proportional to the input power. A digital logic circuit ratios the temperature difference signal and the electric power input signal in a unique manner to produce a single number which is the coefficient of performance of the unit over the test interval. The digital logic and an in-situ calibration procedure enables the instrument to make these measurements in such a way that the ratio of heat flow/power input is obtained without computations. No specialized knowledge of thermodynamics or electronics is required to operate the instrument.

7 Claims, 1 Drawing Figure

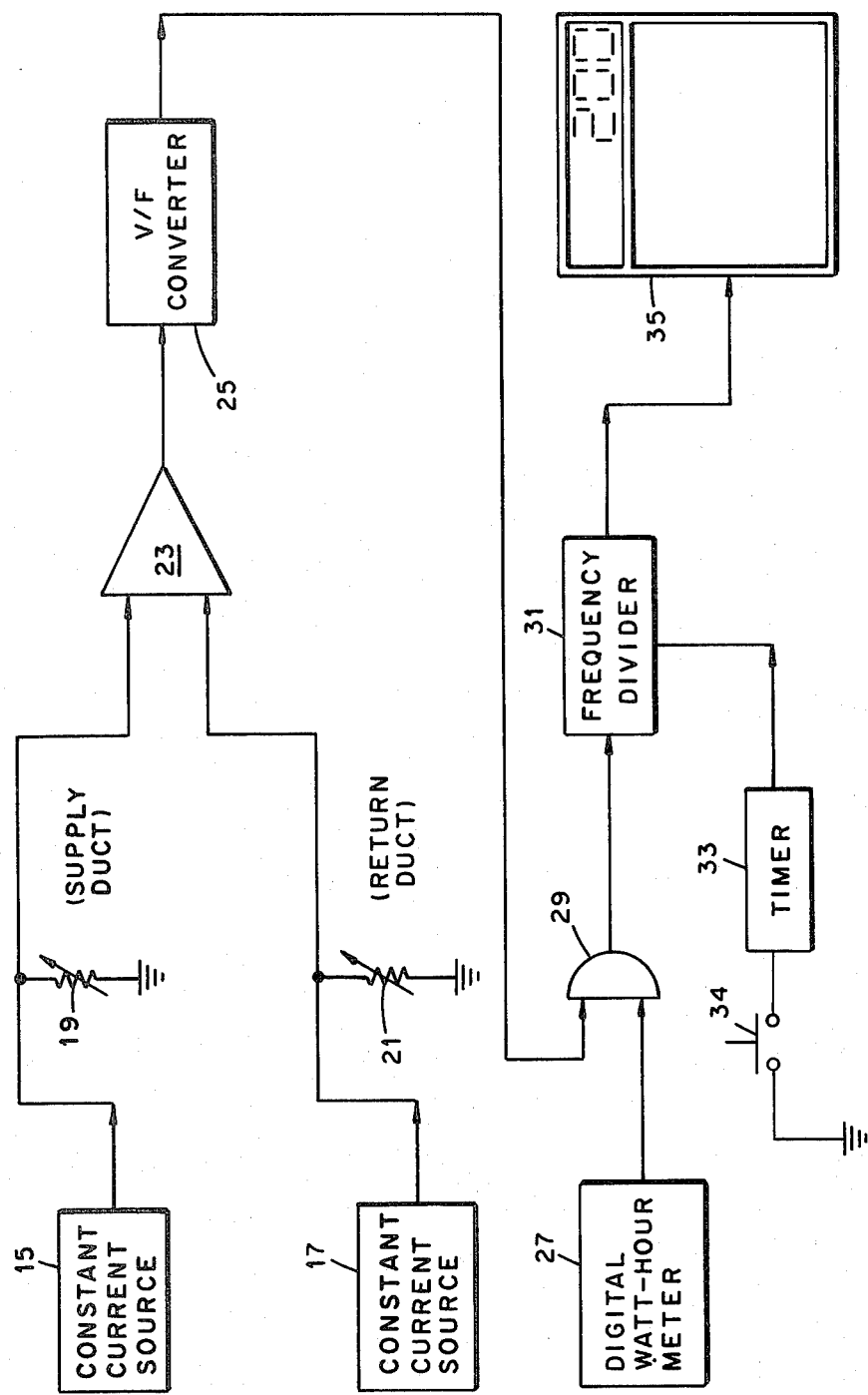

DEVICE AND METHOD FOR MEASURING THE COEFFICIENT OF PERFORMANCE OF A HEAT PUMP

This invention is a result of a contract with the U.S. Department of Energy.

BACKGROUND OF THE INVENTION

The present invention relates to a device and method for measuring the coefficient of performance of an installed heat pump having an auxiliary resistance heating capacity.

The definition of coefficient of performance (COP) for a heat pump in the heating mode is the ratio of the heat flow of the indoor unit to the power input to the heat pump. In order to calculate the COP of the heat pump, it is necessary to measure heat output, or heat flow, and electrical power input and ratio the two numbers to obtain a dimensionless number which is the coefficient of performance. The power input can be obtained by any of a variety of instruments, but heat flow is not easily or quickly measured, particularly on an installed heat pump.

In the prior art, there are several different methods of calculating the COP of a heat pump. These methods, however, either utilize equipment maintained in testing laboratories, or in the case of installed heat pumps, require extensive modifications to the heat pump and associated duct work and also involve considerable knowledge of a trained operator due to the calculations involved in obtainind the COP of a heat pump. These prior art methods, however, can result in significant errors in calculating the COP of an installed heat pump; accuracy of the heat flow measurement is generally directly proportional to the degree of instrumentation and to operator training. Thus, there is a need for a method and an instrument to carry out the method which performs repeatable laboratory-grade COP measurements on installed units which does not require operator calculations or elaborate measurement techniques.

SUMMARY OF THE INVENTION

In view of the above need, it is an object of this invention to provide a method and device for quick and accurate measurement of the COP of an installed heat pump.

Further, it is an object of this invention to provide a method for measuring the COP of an installed heat pump as in the above object in which the heat flow of the unit is determined by a unique calibration measurement using only the resistance heating mode of a heat pump to ascertain the relationship of measured temperature difference across the unit over a fixed interval to the heat flow of the unit. This relationship is then used to determine the ratio of heat flow to energy input of the unit when it is operated in the normal refrigerant heating mode from the measured temperature difference at that time over the same test interval.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the method and device for determining the coefficient of performance of an operating heat pump system of this invention may comprise measuring the temperature difference between the return air stream and the supply air stream of the system while it is operated in the resistance heating mode to determine a calibration relationship between heat flow and temperature differential for the system over a preselected time period. Then, the temperature difference between the return air stream and the supply air stream is measured for an interval equal to a preselected time period while the system is operated in the refrigerant heating mode. Simultaneously, the operating energy input to the system is measured while the system is operated in the refrigerant heating mode. Then the ratio of heat flow to energy input from the measured values of temperature difference and energy input to the unit is determined according to the calibration relationship of the calibration step to provide a direct indication of the COP of the system.

A device for measuring the coefficient of performance of an operating heat pump according to the present invention may comprise means for measuring the temperature differential between a return air stream and a supply air stream of the system and generating a first signal having a frequency proportional to the temperature difference, means for measuring the operating energy input to the heat pump and generating a second signal having a frequency proportional to the input energy, and means for determining the ratio of said first signal frequency to that of said second signal frequency and generating a third signal having a frequency proportional to said ratio. A programmable recording counter means may then be provided for counting the cycles of said third signal over the preselected test interval to register counts according to the preselected counting increment for each of the cycles of said third signal so that the registered count value at the end of the time period is directly indicative of the coefficient of performance of the heat pump over the test interval.

This method and device provides means by which the measured heat flow and power input to an operating heat pump is ratioed to produce a single number, the heat pump's COP, in a matter of minutes with a minimum of equipment and operator skill. The ratio of heat flow to power input is obtained without using an air flow rate sensor since the calibration procedure effectively factors the air mass flow rate and specific heat into the number used as a counting increment for the COP test.

BRIEF DESCRIPTION OF THE DRAWING

The accompanying drawing, which is incorporated in and forms a part of the specification, illustrates an embodiment of the present invention and, together with the description, serves to explain the principles of the invention. The drawing is a single figure including a schematic block diagram representation of a coefficient of performance measuring instrument according to the present invention.

DETAILED DESCRIPTION

The coefficient of performance (COP) is a dimensionless number used to characterize the performance of heat pumps. The definition of COP for a heat pump in the refrigerant heating mode is $COP = Q/P$ where Q is the heat flow of the indoor heat exchange coil and P is the power input to the heat pump. In order to calculate the COP for a heat pump, then, it is necessary to measure heat output, or heat flow, and power input. A variety of instruments are available to measure electrical power input, but heat flow is not as amenable to direct measurement as electrical power. A method of measuring the COP of a heat pump according to this invention involves a heat flow measuring technique which is derived from the first law of thermodynamics. The first law for a control volume where there is no change in internal energy and no work crosses the boundary may be written $\dot{Q} = \dot{m} C_p \Delta T$; where $\dot{Q}$ is the heat flow rate, $\dot{m}$ is the mass flow rate of the heat transfer fluid, $C_p$ is the specific heat of the fluid, and $\Delta T$ is the temperature difference between the entering and exiting fluid streams. If the mass flow rate and the specific heat are constant, this equation reduces to $\dot{Q} = k \Delta T$. In other words, the ratio of heat flow rate to $\Delta T$ for a system is constant as long as the mass flow rate and specific heat are constant, regardless of heat source. Thus, to obtain this relationship, the COP measuring device of this invention is calibrated in place for each test of a heat pump. This is done by running the heat pump in the resistance heating mode only to determine the relationship of heat flow to temperature difference for the particular heat pump system being tested. This relationship is then used to ascertain the heat flow when the heat pump is operated in the normal refrigerant heating mode from the measured temperature difference at that time. The measured heat flow is then ratioed with the measured power over the same test interval to obtain a dimensionless number which is the integrated coefficient of performance of the heat pump over the specified test interval.

Referring now to the drawing, there is shown a schematic block diagram of a COP measuring device constructed in accordance with the teachings of this invention. The instrument employs two constant current sources 15,17 to supply 1 mA of current to each of two resistance temperature detectors (RTD's) 19,21. The RTD's 19,21 may take various forms but must have identical resistance and temperature characteristics so that the temperature difference between them can be accurately measured over a range of temperatures. For example, the RTD's may take the form of commercially available resistance thermometers such as the model S-1107-1 supplied by Minco Products, Inc., Minneapolis, Minn. These resistance thermometers are typically configured in long metal tubular probes with the resistance sensing element located at the end of the probe and leads for connecting the thermometer into the circuit. With this type of RTD, a small hole may be drilld in the supply and return air ducts of the system close to the heat source of the unit so that the RTD 19 may be inserted into the supply duct and the RTD 21 inserted into the return air duct.

It will be obvious to those skilled in the art that various other means may be used to measure the temperature difference of the supply duct and the return air duct to obtain a differential temperature measurement and that the system is not limited to the resistance devices as specifically described in the illustrated embodiment.

As shown in the drawing, one end of the resistance probes 19 and 21 is connected to ground and the other end is connected to the output of the respective constant current source. Further, the ungrounded ends of the RTD probes are connected to separate inputs of a differential voltage amplifier 23. The output of the amplifier 23 is a positive DC voltage which is linearly proportional to the differential voltage input, and thus the differential temperature ($\Delta T$). Typical $\Delta T$'s in operating home heat pumps are 0°–10° C. to 0°–25° C. Thus, the fixed and variable resistors may be selected to provide the proper gain in the differential amplifier circuit which would give a 0-10 volt output for a calculated 9 mv input at 10° C. $\Delta T$ or a 45 mv input at 25° C. $\Delta T$.

The output of the amplifier 23 is connected to the input of a voltage to frequency converter 25 whose output is a signal having a frequency which is directly proportional to the $\Delta T$ of the heat pump. In order to process the signal from the converter in a digital system which follows, the frequency converter may take the form of an analog-to-digital converter whose output is a digital pulse train having a pulse repetition rate directly proportional to the temperature differential $\Delta T$. The output of the converter 25 is connected to one input of an AND gate 29. The state of the other input of AND gate 29 is controlled by the digital signal from a digital watt-hour meter 27. The watt-hour meter 27 may take various forms which generate a digital signal pulse train, or a frequency signal, which has a repetition rate proportional to the heat pump electrical power input. One commercially available meter that may be used is the model PM-1002 supplied by Rochester Instrument Systems, Rochester, N.Y. This meter is a portable meter which has a sensing coil that may be placed around the input power leads to the heat pump unit and provides a digital pulse train having fixed duration (0.3 second) output pulses. The repetition rate of these pulses is linearly proportional to the heat pump electrical power input. When these pulses are present on the line connected to the AND 29, the pulses from the converter 25 are passed by the AND gate to the input of a frequency divider 31. Thus, for each positive pulse from the watt-hour meter 27 the gate 29 will pass a number of pulses from the converter 25. The timing of the pulse trains of the converter and the watt-hour meter are selected so that a given $\Delta T$ and its corresponding frequency, or pulse repetition rate, from the converter 25 produces a specific number of cycles at the output of gate 29 which is registered by the frequency divider 31 over a specific test interval. Thus, the AND gate 29 on-time is greater for lower power inputs and less for higher power inputs corresponding to higher and lower COP's, respectively.

The frequency divider 31 is zeroed and its output held low by means of an electronic timer 33 connected to an enabling input thereof. The electronic timer 33 provides an accurate and consistent time interval required for the measurements of the COP of the unit. The absolute time interval is not critical, but must be of sufficient length to ensure adequate data collection for a test. The timer 33 has an operating run switch 34 connected to an enabling input which, when pressed by the operator, starts the timing interval by releasing the frequency divider 31. A typical timing interval is about 6 minutes. The output of the frequency divider 31 is connected to the count increment input of a programmable recording counter 35. Although various counter arrangements may be used, it has been found that the model TI 1025 supplied by Texas Instruments, Dallas, Tex. is a very inexpensive means for recording the counts of the signals from the frequency divider 31. Since the frequency of the output of the converter 25 is substantially higher than the recording capability of this particular calculator 35, the frequency divider 31 divides the pulses by a specified amount so that the registered count is directly proportional to the coefficient of performance of the unit being tested.

Typically, the output pulse rate of the converter 25 is 0–10 K hertz. Since the calculator 35 is incapable of receiving pulses to increment the counter at this fast rate, remembering that the pulses are gated through at this rate when the output of the watt-hour meter 27 goes high, the frequency divider is selected with an output-/input ratio of 1:4096; for every 4,096 pulses through the AND gat 29, the divider output goes high and causes the calculator to increment the display number by the programmed amount.

In accordance with the method of this invention the COP meter is operated in the following manner to carry out a COP measurement of an installed heat pump system. With the temperature sensors, RTD's 19 and 21, placed in the supply and return air ducts, respectively, and the power measuring device 27 coupled to the heat pump electrical supply circuit, the heat pump is run in the normal refrigerant heating mode for about ten minutes of continuous operation to stabilize the system. The heat pump is switched to the resistance heating mode, and the calculator 35 is initialized by zeroing the display and keying +1 on the keyboard. This is equivalent to programming a programmable increment counter to count in increments of 1 for each pulse received at the input. This procedure sets the calculator counting increment to 1; for every pulse except the first to the calculator from the divider 31, the displayed number would be incremented by 1. After at least ten minutes have elapsed since the switch to the resistance heating mode, the run switch 34 is depressed. The calculator 35 will then count in increments of 1 for several minutes, typically 6 minutes which is controlled by the electronic timer 33. The operator recognizes the termination of the run cycle when the calculator ceases to up-count. Since the COP of the heat pump operating in the resistance heating mode is 1, the reciprocal of the number of pulses counted and displayed is the calibrated counting increment for this particular heat pump system. This provides the calibration relationship between heat flow and the temperature differential $\Delta T$ for this particular system over a preselected time period, the period of the timer 33.

Therefore, after switching the heat pump to the normal refrigerant heating mode, the calculator is initialized by zeroing the display and keying "+(reciprocal)" on the keyboard. When the system has had sufficient time to equilibrate (10 minutes or more), the run switch 34 is again depressed. The calculator now up-counts using the increment entered (the reciprocal of the number of counts recorded in the calibration step); at the termination of the run cycle which is the period of the timer 33, the number shown on the calculator display is the integrated COP of the heat pump over the test period.

Thus, it will be seen that a very inexpensive device and accurate and simple method of determining the COP of an installed heat pump has been provided. It requires no special knowlege of thermodynamics or electronics to operate the COP meter in accordance with the prescribed method to obtain the COP measurement.

Using a resistance heating mode to calibrate the measuring device in place makes it possible to test systems having quite different air flow rates and temperature differences with a single instrument. The digital logic and in-situ calibration method eliminates complex mathematical calculations and specialized operator training. An air flow sensor is not required because the calibration procedure effectively factors the air mass flow rate and specific heat into the number used as a counting increment for the COP test during the refrigerant heating mode.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention as its practical application to thereby enable others skilled in the art to best utilize the invention in various embodiments and with various modifications as are suited to the particular use contemplated. It is intended that the scope of the invention be defined by the claims appended hereto.

What is claimed is:

1. A device for measuring the coefficient of performance of an electrically operated heat pump having a supply air stream and a return air stream, comprising:
    means for measuring the temperature differential between said return air stream and said supply air stream and generating a first signal having a frequency proportional to the temperature difference of said streams;
    means for measuring the operating energy input to said heat pump and generating a second signal having a frequency proportional to said energy input;
    means for determining the ratio of said first signal frequency to said second signal frequency and generating a third signal having a frequency proportional to said ratio; and
    a programmable counting means for counting the cycles of said third signal over a preselected time period to register counts according to a preselected counting increment for each of said cycles of said third signal so that the registered count value at the end of said time period is directly indicative of the coefficient of performance of said heat pump over said time period.

2. The device as set forth in claim 1 wherein said means for measuring the temperature differential between said return air stream and said supply air includes first and second temperature sensing means disposed in said return and said supply air streams, respectively, for generating first and second output voltage signals, respectively, having an amplitude proportional to the temperature of the respective air streams; a differential amplifier having first and second inputs connected to receive said first and second output signals of said first and second temperature sensing means, respectively, and a voltage-to-frequency converter connected to the output of said amplifier for generating a digital signal having a pulse repetition rate proportional to the amplitude of the differential voltage output of said amplifier.

3. The device as set forth in claim 2 wherein said means for measuring the energy input to said heat pump includes a digital watt-hour meter connected to measure the power input to said heat pump and generating a train of pulses at a repetition rate proportional to said power input and having a fixed pulse period substantially greater than the period of said pulses from said converter and wherein said means for determining the ratio of said first signal frequency to said second signal frequency includes an AND gate having a first input connected to the output of said converter and a second input connected to the output of said digital watt-hour meter.

4. The device as set forth in claim 3 wherein said programmable counting means is a count increment programmable calculator having a programmable counter input coupled to the output of said AND gate.

5. The device as set forth in claim 3 further comprising an electronic timing means coupled with the output of said AND gate for automatically controlling the application of said pulses from said AND gate to said counting means for said preselected test interval.

6. A method of determining the coefficient of performance of a heat pump system having a supply air stream in a return air stream, said heat pump being selectively operable and a refrigerant heating mode and a resistance heating mode, comprising the steps of:
  measuring the temperature differential between said return air stream and said supply air stream while said system is operated in said resistance heating mode to determine a calibration relationship between heat flow and said temperature differential for said system over a preselected time period;
  measuring the temperature differential between said return air stream and said supply air stream for an interval equal to said preselected time period while said system is operated in said refrigerant heating mode;
  measuring the operating energy input to said system while said system is operated in said refrigerant heating mode for a period equal to said preselected time period; and
  producing a ratio value of the measured values of steps 2 and 3 according to said calibration relationship of step 1 as a direct indication of the coefficient of performance of said system.

7. A method of determining the coefficient of performance of an electrically operated heat pump system having a supply air stream and a return air stream, said system being operable in a refrigerant heating mode and a resistance heating mode, comprising the steps of:
  operating said system in said resistance heating mode;
  generating a first signal having a frequency proportional to the temperature differential between said supply air stream and said return air stream while operating said system in said resistance heating mode;
  generating a second signal having a frequency proportional to the operating power input to said system;
  generating a third signal having a frequency proportional to the ratio of said first signal to said second signal;
  counting the cycles of said third signal and registering the counts over a selected time interval;
  operating said system in said refrigerant heating mode;
  generating a fourth signal having a frequency proportional to the temperature differential between said return air stream and said supply air stream;
  generating a fifth signal having a frequency proportional to the power input applied to said system;
  generating a sixth signal having a frequency proportional to the ratio of said fourth signal to said fifth signal;
  counting the cycles of said sixth signal and registering the count in the increments equal to the reciprocal of the registered count in step five over a period equal to said selected time interval as a direct indication of the coefficient of performance of said system in said refrigerant heating mode.

* * * * *